(12) United States Patent
Hull

(10) Patent No.: US 11,609,540 B2
(45) Date of Patent: Mar. 21, 2023

(54) COOPERATIVE MULTI-ACTUATOR VARIABLE BANDWIDTH CONTROLLER

(71) Applicant: Simmonds Precision Products, Inc., Vergennes, VT (US)

(72) Inventor: Richard A. Hull, Kissimmee, FL (US)

(73) Assignee: Simmonds Precision Products, Inc., Vergennes, VT (US)

( * ) Notice: Subject to any disclaimer, the term of this patent is extended or adjusted under 35 U.S.C. 154(b) by 454 days.

(21) Appl. No.: 16/775,837

(22) Filed: Jan. 29, 2020

(65) Prior Publication Data

US 2021/0232103 A1    Jul. 29, 2021

(51) Int. Cl.
*G05B 13/02*   (2006.01)
*G02B 5/08*   (2006.01)
*G05D 1/08*   (2006.01)

(52) U.S. Cl.
CPC .......... *G05B 13/0205* (2013.01); *G02B 5/08* (2013.01); *G05D 1/085* (2013.01)

(58) Field of Classification Search
CPC .......... G05D 1/108; G05D 1/107; G05D 1/12; G05D 1/08; G05D 1/0816; G05D 1/0825; G05D 1/0833; G05D 1/0841; G05D 1/085; F42B 15/01; G05B 13/0205
See application file for complete search history.

(56) References Cited

U.S. PATENT DOCUMENTS

| | | | | |
|---|---|---|---|---|
| 5,094,406 | A | * | 3/1992 | Shafer .................... G05D 1/107 244/3.21 |
| 5,374,011 | A | * | 12/1994 | Lazarus .................. B64G 1/36 244/76 R |
| 7,048,234 | B2 | | 5/2006 | Recksiek et al. |
| 7,556,224 | B2 | | 7/2009 | Johnson et al. |
| 8,478,456 | B2 | | 7/2013 | Sowers et al. |
| 9,190,942 | B2 | | 11/2015 | Polcuch |
| 10,071,799 | B2 | | 9/2018 | Bauer et al. |
| 10,315,753 | B2 | | 6/2019 | McCormick et al. |
| 2013/0041527 | A1 | * | 2/2013 | Sowers .................. F42B 10/64 701/3 |
| 2014/0365035 | A1 | | 12/2014 | Hindman |
| 2018/0073441 | A1 | | 3/2018 | Cai et al. |

OTHER PUBLICATIONS

Partial European search report issued in corresponding EP Application No. 21154121.4, dated Jun. 22, 2021.
Extendeding European search report issued in corresponding EP application No. 21154121.4, dated Sep. 24, 2021.
(Continued)

*Primary Examiner* — Schyler S Sanks
(74) *Attorney, Agent, or Firm* — Locke Lord LLP; Daniel J. Fiorello; Gabrielle L. Gelozin

(57) ABSTRACT

A system including a system controller configured to transmit a first amount of commands in order to produce a desired effect by a group of actuators acting in combination. A system controller configured to control a group of at least two actuators in order to produce at least one combined effect, wherein the number of actuators is greater than or equal to the number of effects. A system controller configures to independent and variable bandwidths or responses of the desired effects produced by the actuators acting in combination.

14 Claims, 3 Drawing Sheets

(56) References Cited

OTHER PUBLICATIONS

Looze D.P. et al.,: Investigation of The use of Acceleration Estimates by Endgame Guidance Laws, Journal of Guidance and Control and Dynamics, AIAA, Reston, VA, US., vol. 13, No. 2, Mar. 1, 1990, pp. 198-206, XP000175538, ISSN: 0731-5090.
Communication pursuant to Article 94(3) EPC, prepared by the European Patent Office, dated May 16, 2022, issued in corresponding European Patent Application No. 21154121.4.

* cited by examiner

COOPERATIVE MULTI-ACTUATOR VARIABLE BANDWIDTH CONTROLLER

BACKGROUND

1. Field of the Disclosure

The present disclosure relates to an actuator controller and more particularly, to a controller adapted to control multiple actuators.

2. Description of Related Art

Electric driven motors are used in a wide variety of applications including both commercial and military applications. In many applications, the individual actuators are part of a multi-actuator system in which the actuators are controlled externally in a cooperative scheme to achieve one or more combined effects. Some typical applications include fins and control surfaces on aircraft, missiles or guided projectiles, in which at least two or more control surfaces are used collectively or differentially to control roll, pitch and yaw motions of the air vehicle. Typical multi-actuator system applications use individual actuators to drive individual control fins in a 1:1 relationship. Each actuator subsystem is independently controlled and receives individual fin position commands from an external system computer, such as an autopilot, and reports back estimates of the fin position and angular rate.

While conventional methods and systems have generally been considered satisfactory for their intended purpose, there is still a need in the art for a system and method that can control the response bandwidth of each of effect (such as roll, pitch and yaw) independently.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

A system comprising a system controller configured to transmit a first amount of commands in order to produce a desired effect on a group of actuators acting in combination and a system controller configured to control a group of at least two actuators in order to produce at least one combined effect, wherein the number of actuators is greater than or equal to the number of effects. The system controller can be a multiple actuator controller. The system controller can be configured to achieve variable bandwidths of the at least one effect. The controller can be configured to achieve independent bandwidths for each of the effects of the at least one effect. Each of the effects of the at least one combined effect can include a different bandwidth.

The controller can be configured to compute gains and products, and compute actuator commands based on the computed computer gains and products. The controller can be configured to use estimated reaction torque and rotational speed to maintain desired system bandwidths response to external loads. At least one effect modifies at least one control surface, wherein the at least one control surface can be a control surface for a guided projectile, or a mirror for a space telescope, or a collector panel for a solar array.

A method for using the system includes commanding a controller a desired actuation combined effect by a computer controlling a series of actuators in order achieve a combined effect on the vehicle. A method for using the system includes computing by the controller a series of commands for a combination of actuators to achieve independent and variable bandwidths or response times for each of the desired effects. The desired allocation of effects to actuators, or mixing logic, and the desired bandwidth of each effect can be either preset in the controller, or supplied and updated over an external communications port from an external system. The effects can include but are not limited to roll, pitch, and yaw of a guided projectile An external user or system specifies a cooperative control mixing allocation matrix of the group of actuators to achieve the at least one combined effects. The controller can use an estimated reaction torque and rotational speed of each actuator to maintain a desired system bandwidth or response of each effect in the presence of external actuator loads. The method can include modifying a desired effect bandwidth or response time in order to conserver and optimize energy usage.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
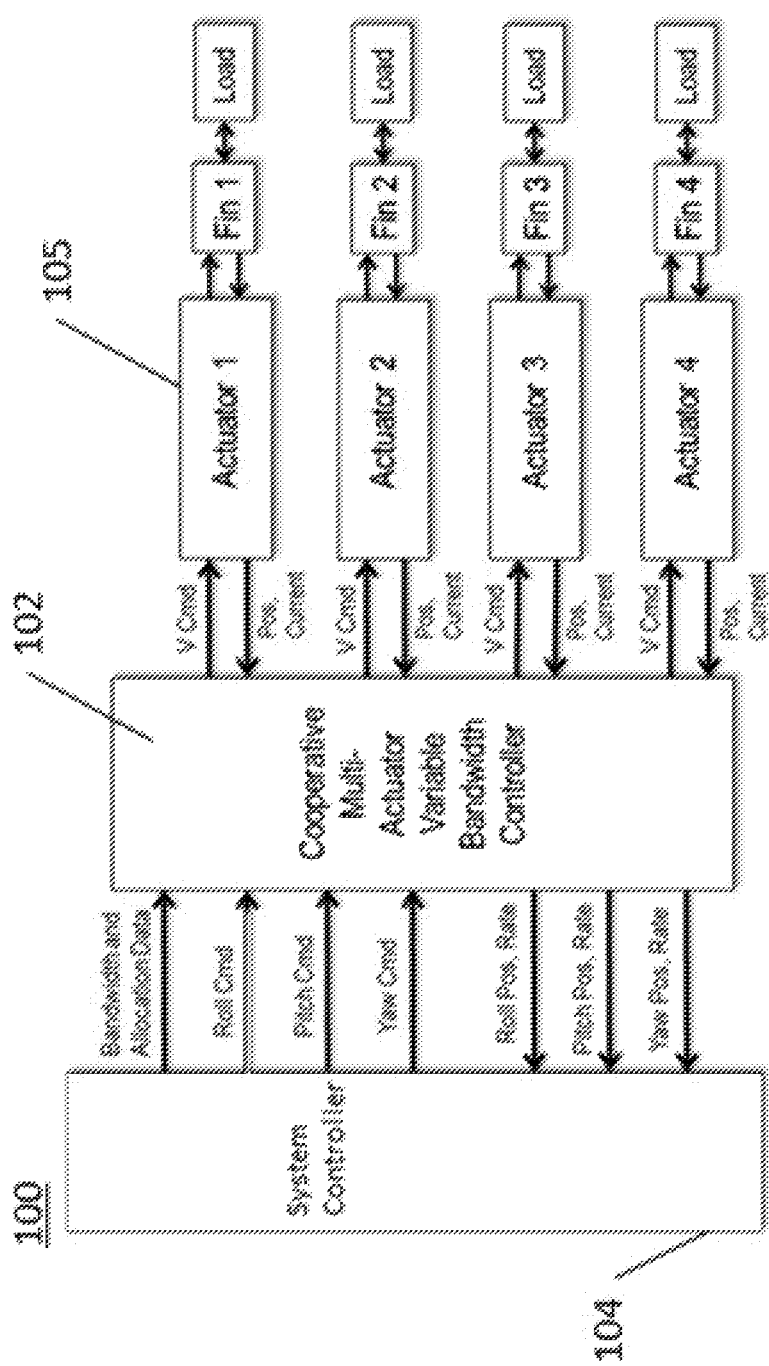
FIG. 1 is a block diagram of an actuator system in accordance with embodiments of the disclosure.

The illustrated embodiments are now described more fully with reference to the accompanying drawings wherein like reference numerals identify similar structural/functional features. The illustrated embodiments are not limited in any way to what is illustrated, as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this present disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Turning now descriptively to the drawings, in which similar reference characters denote similar elements throughout the several views, FIG. 1 depicts an exemplary actuator system 100 in which below illustrated embodiments may be implemented. Actuator system 100 includes an actuator controller 102 that is configured to allow user or automated selection of bandwidth or response time of the actuator system 100 during operation. The selected bandwidth can be provided, for example by an external system controller (not shown). Bandwidth is related to the reciprocal of response time, and each reference to bandwidth encompasses reference to response time.

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

FIG. 1 shows a cooperative multi-actuator variable bandwidth controller architecture system 100. This system differs from the typical actuator controller architecture in three important ways: 1) A single controller 102 receives a first number (m) of system commands and computes a second number (n) of actuator motor controller commands for all of the individual actuators in the system, 2) The single controller 102 incorporates knowledge of an? allocation matrix that apportions m effects into n actuators 105 as well as the desired bandwidths of the m effect responses, 3) an embedded computation of the cooperative multi-actuator controller gains based on the externally commanded bandwidths and allocation matrix.

Externally supplied bandwidths may be either be fixed in software settings or may be modified during operation by an external system controller 104 to allow the system 100 to assume a different bandwidth responses at different times or phases of system operation. The system 100 has the ability to control the response bandwidth of each of the m effects (such as roll, pitch and yaw) independently. Modifying the bandwidth in real time is beneficial in applications where the response requirements change significantly during its operation, such as for a missile system during mid-course glide versus terminal maneuver. The ability to use lower bandwidths when appropriate can lead to significant power savings, which can reduce battery size and/or electric generation requirements.

Figure 2:
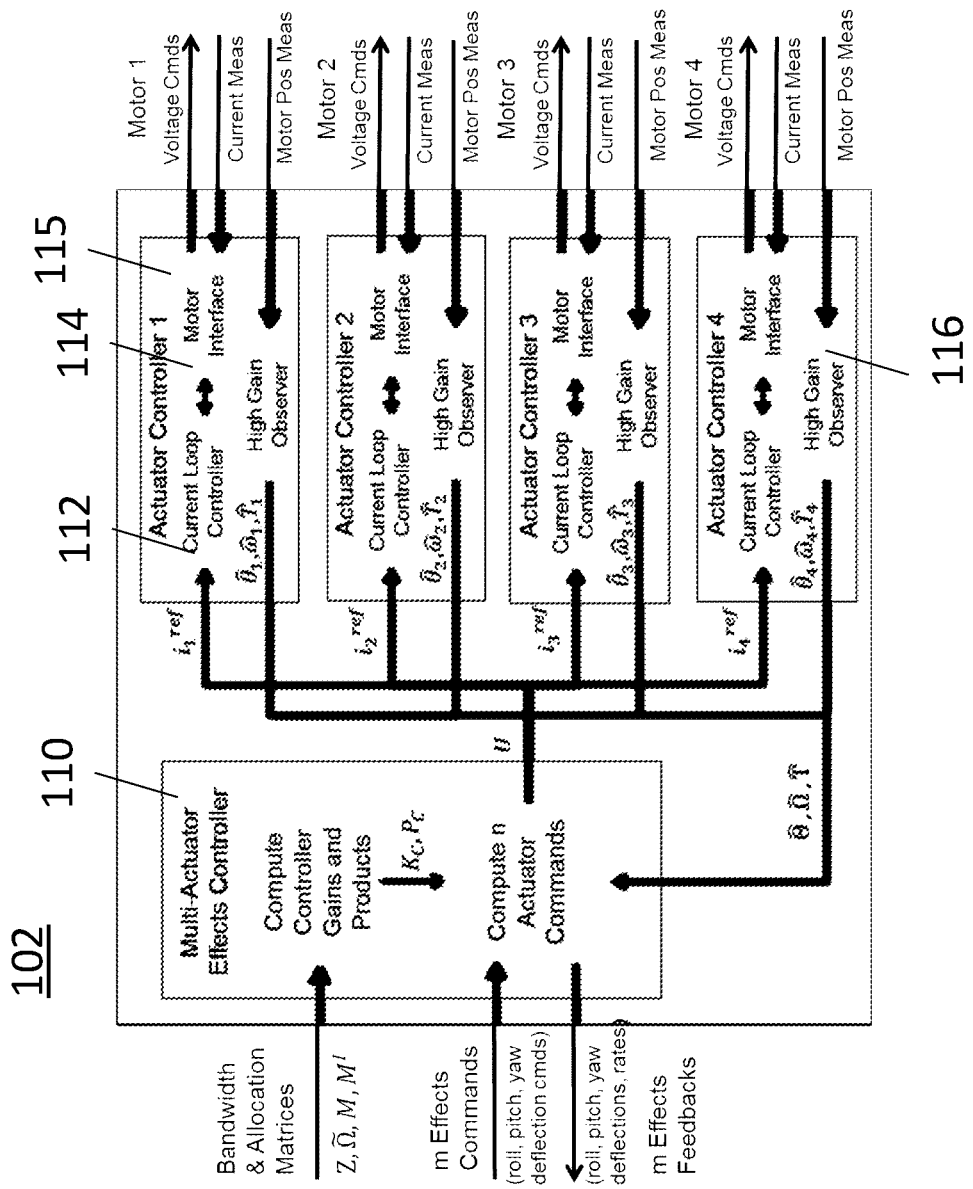
FIG. 2 is a block diagram of a controller of the actuator system shown in FIG. 1.

FIG. 2 shows the architecture of the Cooperative Multi-Actuator Variable Bandwidth Controller 102. The architecture consists of a Multi-Actuator Effects Controller module 110 and Actuator Controller modules 115 1 . . . n. The Multi-Actuator Effects Controller 110 communicates with the external user supplied System Controller 104 (shown in FIG. 1) and receives the Bandwidth and Allocation Matrix information for the m number of effects (such as roll, pitch, yaw), and the m number of effects commands. The Multi-Actuator Effects Controller 110 also provides feedbacks to the external System Controller 104 such as positions and rates of them effects.

The Multi-Actuator Effects Controller 110 computes the applicable controller gain and product matrices and uses them to compute the actuator current loop inputs for the n physical actuators 105 in the system. The Actuator Controller modules 1 . . . n each receive the specific current input command $i_1^{ref}$ . . . $i_n^{ref}$ and compute individual voltage commands to control the 1 . . . n actuators 105. The Actuator Controller modules 115 each contain a Current Loop Controller 112, a Motor Interface module 114 and the High Gain Observer Module 116 specific to each of the 1 . . . n physical actuators 105. The current loop controller 112 receives the actuator motor current reference commands $i_q^{ref}$, $i_d^{ref}$, and uses a standard PID electric-motor controller design in the d-q reference frame to compute the required voltage reference commands $v_q^{ref}$, $v_d^{ref}$, to the motor interface module 114. The motor interface module 114 receives the 3 phase current measurements from the motor current monitor device and the estimated motor rotor position from the High Gain Observer module 116. The motor controller interface module 114 converts the voltage reference commands from the d-q reference frame to the 3 phase voltages required to control the actuator electric motor. The current monitor interface module 114 converts the 3 phase current measurement received from the current monitor device into the d-q reference frame, and provides the motor current feedbacks to the current loop controller module. The design of the Current Loop Controller 112 and the Motor Interface modules 114 may be tailored to meet different types and grades of motors used in actuation systems, including but not limited to inductive motors, permanent magnetic synchronous motors, and with additional interface calculations, motors requiring pulse width modulation (PWM) control.

Figure 3:
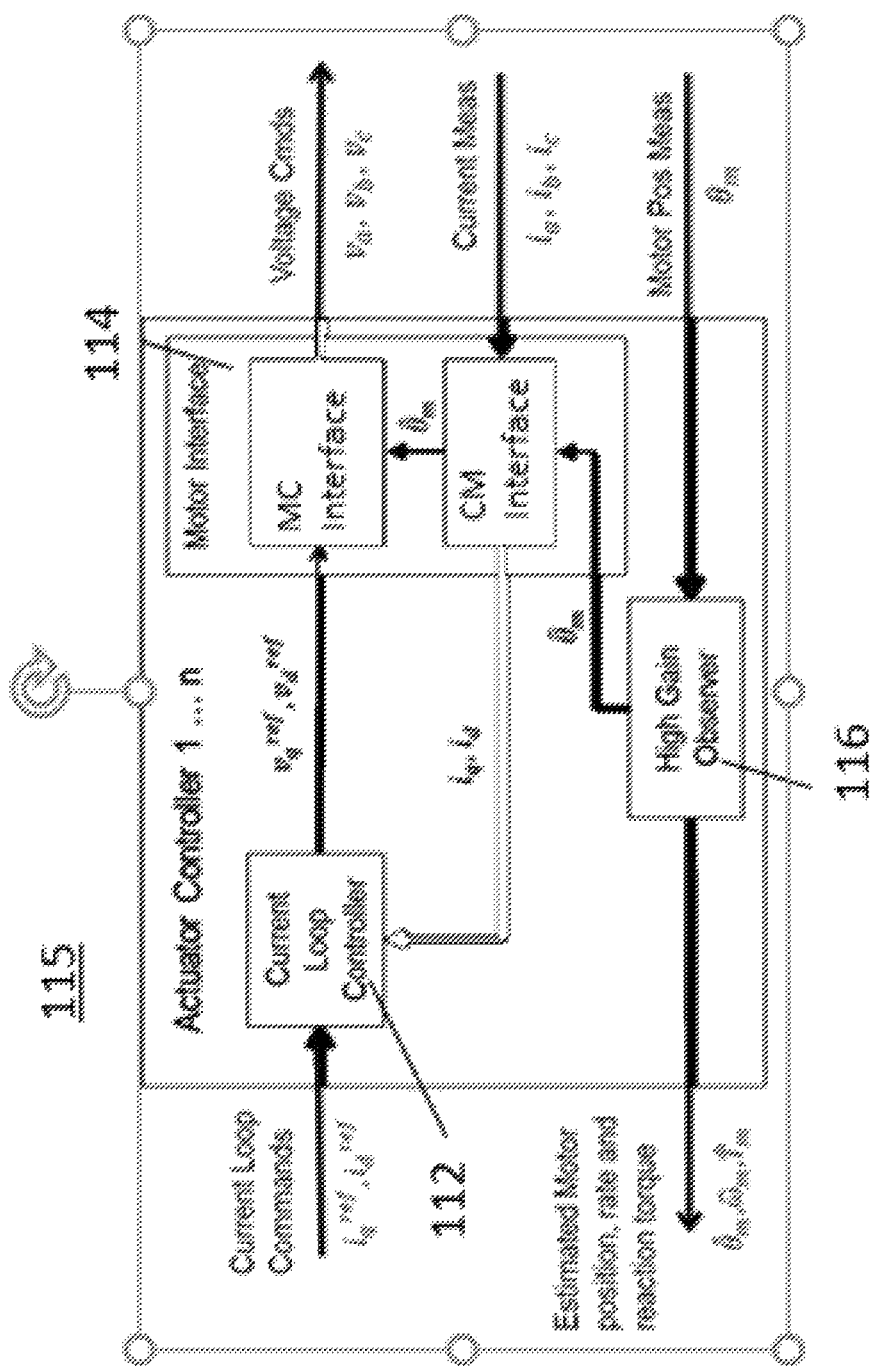
FIG. 3 is a schematic diagram of an Actuator Controller Modules shown in FIG. 2.

FIG. 3 shows The High Gain Observer 116 configured to measure motor positions received from the motor position encoder device to provide real time estimates of the motor rotor position, angular rate and reaction torque. The High Gain Observer 116 is designed for each of the 1 . . . n actuators 105 and embedded in the Actuator Controller module 115 with Current Loop Controller module 112 and Motor Interface Module 114. The High Gain Observer module 116 contains parameters and gains that are specific to individual actuators and may be tailored to accommodate actuators 105 of different types and with different characteristics within the multi-actuator group. Because the reaction torque of each actuator 105 is estimated quickly by the High Gain Observer 116 and directly compensated for in the Effects Multi-Actuator eController 110, the bandwidth requirements of the individual actuators are decoupled from the max load torque requirements. This allows the multi-actuator system 100 bandwidths to be lowered even when the multi-actuator system is subjected to relatively high external load torques. Another advantage of this architecture is that the multi-actuator system 100 displays a consistent response for the specified effects bandwidths independent of the external loading. For example, this could prevent or reduce asymmetric responses of missile or aircraft roll control surfaces, which are experiencing different aerodynamic loading due to angle of attack or aerodynamic shading. Although the example application described is for controlling an airframe using four actuated fins for roll, pitch and yaw control, this example is for illustrative purposes and in no way is intended to limit the scope of applicability of the invention. The invention applies to any application where two or more actuators are used in a cooperative system to control one or more effects.

Multi-actuator systems are often used to achieve control effects through the combined effects of their independent dynamics. The system designer must apportion each of the m desired effects to the n individual actuators by establishing an allocation, or mixing, transformation defined by: $\Delta_n = M\Delta_m$ where $n \geq m$, that is the number of actuators must greater or equal to the number of effects to be controlled. As an example, consider the design of a fin controlled missile system in which 4 fin actuators are used to control the 3 body motions of roll, pitch and yaw.

One example of such a 4 fin allocation matrix is $$\underbrace{\begin{bmatrix} \delta_1 \\ \delta_2 \\ \delta_3 \\ \delta_4 \end{bmatrix}}_{\Delta_n} = \underbrace{\begin{bmatrix} 1 & -1 & 1 \\ 1 & -1 & -1 \\ 1 & 1 & -1 \\ 1 & 1 & 1 \end{bmatrix}}_{M} = \underbrace{\begin{bmatrix} \delta_p \\ \delta_q \\ \delta_r \end{bmatrix}}_{\Delta_m}$$

where the fins are used in the "X" aerodynamic configuration, with combinations of all four fins are used to control all three axes of roll, pitch and yaw motion. Another example is given by:

$$\underbrace{\begin{bmatrix} \delta_1 \\ \delta_2 \\ \delta_3 \\ \delta_4 \end{bmatrix}}_{\Delta_n} = \underbrace{\begin{bmatrix} 1 & -1 & 0 \\ 1 & 0 & -1 \\ 1 & 1 & 0 \\ 1 & 0 & 1 \end{bmatrix}}_{M} = \underbrace{\begin{bmatrix} \delta_p \\ \delta_q \\ \delta_r \end{bmatrix}}_{\Delta_m}$$

where the fins are used in the "+" aerodynamic configuration, with all four fins used for roll, but two fins used exclusively for pitch and two fins used exclusively for yaw. Many different variations and examples are found in the control of aerospace vehicles from aircraft, rotor vehicles, missiles, launch rockets and spacecraft. However, the applicability and scope of this invention is not limited to aerospace vehicles, but extends to any application where multiple actuators are used to achieve cooperative or collaborative effects.

In each case a reverse transformation, $M^I$, can be found:

$$\Delta_m = M^I \Delta_n$$

by taking the pseudo inverse of $M$:

$$M^I = M^\# = (M^T M)^{-1} M^T$$

It is well established that for the Penrose-Moore pseudo inverse given above every real n×m matrix M of rank r, there is a unique m×n pseudo inverse $M^\#$ of rank r. Referencing the examples above:

$$\text{If } M = \begin{bmatrix} 1 & -1 & 1 \\ 1 & -1 & -1 \\ 1 & 1 & -1 \\ 1 & 1 & 1 \end{bmatrix} \text{ then } M^I = \left(\frac{1}{4}\right) \begin{bmatrix} 1 & 1 & 1 & 1 \\ -1 & -1 & 1 & 1 \\ 1 & -1 & -1 & 1 \end{bmatrix}$$

$$\text{And if } M = \begin{bmatrix} 1 & -1 & 0 \\ 1 & 0 & -1 \\ 1 & 1 & 0 \\ 1 & 0 & 1 \end{bmatrix} \text{ then } M^I = \begin{bmatrix} \frac{1}{4} & \frac{1}{4} & \frac{1}{4} & \frac{1}{4} \\ -\frac{1}{2} & 0 & \frac{1}{2} & 0 \\ 0 & -\frac{1}{2} & 0 & \frac{1}{2} \end{bmatrix}$$

In some cases it may be desirable or necessary to change the allocation transformation matrix during operation. This ability could be used to accommodate actuators which "deploy" or begin operation at different times, such as deployable canards or deployable wings with actuated ailerons. This ability could also be used to accommodate robust reconfigurable control systems after the loss or failure of an actuator or actuated surface.

The methods and systems of the present disclosure, as described above and shown in the drawings, provide for a controller with superior properties including increased reliability. While the apparatus and methods of the subject disclosure have been shown and described with reference to embodiments, those skilled in the art will readily appreciate that changes and/or modifications may be made thereto without departing from the spirit and score of the subject disclosure.

What is claimed is:

1. A system comprising:
   a system controller configured to transmit an m number of commands in order to produce m number of effects on a group of n actuators acting in combination; and
   a controller configured to control the group of n actuators in order to produce at least one combined effect, wherein n number of actuators is greater than or equal to the m number of effects,
   wherein the controller is configured to achieve independent and/or variable bandwidths for each of the effects of the m number of effects and for each actuator of the group of n actuators, wherein each of the effects of the at least one combined effect includes a different bandwidth,
   wherein the independent bandwidth for each of the effects of the at least one combined effect is supplied from an external source, wherein the controller is configured modify the externally supplied bandwidths in real time to achieve the different bandwidth responses at different times or phases of system operation,
   wherein the m number of effects includes one or more of roll, pitch, or yaw.

2. The system of claim 1, wherein the system controller is a multiple actuator controller.

3. The system of claim 1, wherein the controller is configured to compute gains and products, and compute actuator commands based on the computed gains and products.

4. The system of claim 1, wherein the controller is configured to use estimated reaction torque and rotational speed to maintain desired system bandwidths response to external loads.

5. The system of claim 1, wherein the at least one effect modifies at least one control surface.

6. The system of claim 1, wherein the at least one control surface is a projectile control surface.

7. The system of claim 1, wherein the at least one control surface is a mirror.

8. A method comprising the steps of:
commanding an actuator controller to initiate a desired actuation combined effect by a computer;
controlling by the actuator controller a number of actuators in order achieve a combined effect on a vehicle;
computing by the actuator controller a plurality of commands for a combination of actuators;
computing by the actuator controller a series of bandwidths for the plurality of commands;
apportioning by the actuator controller necessary effects of each of the actuators and necessary bandwidths for responses; and
controlling the actuators according to the desired bandwidths,
wherein the series of bandwidths includes independent and/or variable bandwidths for each necessary effect of each of the actuators and for each actuator of the number of actuators, wherein each necessary effect of each of the actuators includes a different bandwidth,
wherein the independent bandwidth for each necessary effect of each of the actuators is supplied from an external source,
wherein controlling the actuators according to the desired bandwidths includes modifying the externally supplied bandwidths in real time to achieve the different bandwidth responses at different times or phases of vehicle operation,
wherein the necessary effects of each of the actuators includes one or more of roll, pitch, or yaw.

9. The method of claim 8, wherein the controller receives a first amount m of commands from the computer, and computes an amount m of effects directed at the combination of actuators.

10. The method of claim 9, wherein the first amount of commands does not equal the second amount of commands.

11. The method of claim 8, wherein the number of actuators must be greater or equal to the number of effects to be controlled.

12. The method of claim 8, wherein an external user or system specifies a cooperative control mixing allocation matrix of the group of actuators to achieve the at least one combined effects.

13. The method of claim 8, further comprising the controller using an estimated reaction torque and rotational speed to maintain a desired system bandwidth response in the presence of external loads.

14. The method of claim 8, further comprising actively controlling a system response time and energy usage.

* * * * *